United States Patent Office 3,558,559
Patented Jan. 26, 1971

3,558,559
AROMATIC AMINE MODIFIED NOVOLAC RESINS IN COMBINATION WITH AROMATIC POLYCARBOXYLIC COMPOUNDS
John R. Le Blanc, Wilbraham, Mass., assignor to Monsanto Company, St. Louis, Mo., a corporation of Delaware
No Drawing. Filed Jan. 21, 1969, Ser. No. 792,818
Int. Cl. C08g 5/18
U.S. Cl. 260—51.5                                  6 Claims

ABSTRACT OF THE DISCLOSURE

Thermosettable polymeric compositions incorporating an amine modified novolac resin and an aromatic polycarboxylic compound. When thermoset by heat, these compositions display improved thermal stability.

BACKGROUND

Heretofore, those skilled in the art of phenolic resins have long appreciated that such resins, especially those of the novolac type, have their thermosetting character enhanced or promoted through the use of curing agents, such as hexamethylenetetramine, and the like. The art has long sought to improve the characteristics of cured (cross-linked) thermosettable phenolic resins through varying either or both the chemical compositions and amounts, respectively, of phenolic resin and curing agent employed in any given instance.

One of the characteristics of thermoset phenolic resins which has been particularly difficult to improve has been that of thermal stability, such as the ability of a particular thermoset phenolic resin to withstand, and be stable to, prolonged exposure to elevated temperature. Such thermal stability can be measured by any convenient means, such as by thermal gravimetric analysis, or by strength retention measurements (or weight loss measurements) of standardized laminate constructions (containing a given thermoset phenolic resin to be tested).

Such difficulties in improving thermal stability, recent evaluations have apparently shown, are probably inherently caused by the structural limitations in three-dimensional cross-linked phenolic resins. A cured phenolic resin does not heat soften or change dimensions upon heat exposure but instead tends to degrade and lose structural integrity once an inherent threshold temperature (typically, about 450° F.) has been exceeded for an appreciable period of time.

A new and much improved class of thermosettable phenolic resins has now been discovered. This class comprises a thermosettable mixture of amine modified novolac resins and aromatic polycarboxylic compounds. When compared with conventional novolacs conventionally cured (as with hexamethylenetetramine), this new class of phenolic resins has surprising thermal stability when thermoset. This improvement in thermal stability is, it is theorized (and there is no intent to be bound by theory herein), a result of the increased structural strength on a molecular cross-linking basis associated with these new phenolic resins.

SUMMARY

The present invention relates to new and useful thermosettable phenolic resin compositions of matter, to thermoset compositions produced therefrom, and to articles of manufacture incorporating such compositions. In relation to comparable prior art phenolic resin compositions, these new compositions generally have improved thermostability when thermoset.

The thermosettable compositions of this invention comprise at least one amine modified novolac phenolic resin and at least one aromatic polycarboxylic compound. Such an amine modified novolac resin is generally characterized by having:

(1) A number average molecular weight of from about 200 to 1000,
(2) At least two aryl moieties per molecule, the aryl nucleus of each aryl moiety containing from 6 through 10 carbon atoms each,
(3) At least one divalent bridging moiety of the formula:

wherein $R_1$ and $R_2$ are each individually selected from the group consisting of hydrogen, lower alkyl, lower alkalene, lower haloalkyl, aryl of from 6 through 12 carbon atoms, haloaryl of 6 through 12 carbon atoms, and heterocyclic structures containing rings with 5 or 6 members each, each individual ring containing an oxygen, a sulphur, or a nitrogen atom, each such heterocyclic structure being bonded to the carbon atom of said bridging moiety, said bridging moiety having the unsatisfied valences of its carbon atom each bonded to a different one of said aryl moieties,
(4) At least one >NH group per molecule, one bond of which is directly attached to one of said aryl nuclei and the other bond of which is attached to another of said aryl nuclei or to a radical $R_1$ as defined above,
(5) At least one OH group per molecule each such group being directly attached to a different one of said two aryl nuclei,
(6) A percent oxygen acetyl of from about 3 to 26, and
(7) A percent nitrogen acetyl of from about 3 to 26.

Similarly, such an aromatic polycarboxylic compound is characterized as being within the given class of compounds having the general formula:

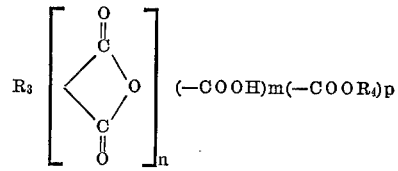

six valences and containing from 6 to 24 carbon atoms; in which $R_3$ is an aromatic radical of three, four, five, or $R_4$ is a monovalent hydrocarbon radical containing less than 19 carbon atoms; $n$ is an integer of from 0 through 3; $m$ is an integer of from 0 through 6; $p$ is an integer of from 0 through 6; when $n$ is 0, the sum of $m+p$ is an integer of from 3 through 6, when $n$ is 1, the sum of $m+p$ is an integer of from 1 through 4; when $n$ is 2, the sum of $m+p$ is an integer of from 0 through 2; and the sum of $n$ and $p$ is always at least 1.

Preferably, $R_1$ and $R_2$ are both hydrogen, $R_3$ contains a single six membered aromatic ring (i.e., phenyl), and $R_4$ is a lower alkyl radical. The term "lower" as used herein refers to a radical containing less than seven carbon atoms.

In general, in any given composition of this invention, there is present for a given amount of such amine modified novolac resin, at least sufficient amount of such aromatic polycarboxylic compound to make the resulting composition thermosettable by heat alone (especially when such composition is in the form of a uniform mixture of the respective two components); for example, at a temperature of about 150° C.

In general, thermosetting of a thermosettable resin composition of this invention results from the reaction of an aromatic polycarboxylic compound with the reactable aromatic amine and the reactable aromatic hydroxyl group in an amine modified novolac starting material. Sometimes as little as about 5 or 10 weight percent (or even less) of the stoichiometric amount (that is, the amount of dicarboxyl compound) needed to completely react on a 1:1 mol basis each reactable aromatic amine group plus each reactable aromatic hydroxyl group with dicarboxyl compound is sufficient to effect thermosetting. On the other hand, sometimes as much as a 100 percent excess (or even more) of the stoichiometric amount as just described of dicarboxyl compound is desirable in a composition of the invention to produce thermosetting of a composition of this invention. Preferably, from about 80 to 110 weight percent of such stoichiometric amount is employed.

For purposes of this invention, the term "thermoset" or "thermosetting" in reference to compositions of this invention indicates that a given thermosettable composition of this invention, after exposure to elevated temperatures for times sufficient to substantially completely react together substantially all of one of the two components (depending upon which one is present in excess of stoichiometric amount) with the other component comprising a composition of this invention so as to produce a product which is not only substantially insoluble, but also is substantially infusible. For purposes of this invention, the term "substantially insoluble" in relation to "thermoset" or "thermosetting" has reference to insolubility in common organic solvents, such as methyl ethyl ketone, so that not more than about 10 weight percent of a given so thermoset product dissolves in such a solvent. Similarly, the term "substantially infusible" has reference to the fact that a given or thermoset product does not appreciably melt before decomposing when heated to elevated temperatures.

Because of the tendency for undesirable side reactions to occur (such as hydrolysis of the Formula 2 compounds), and because of the possibility that the thermosettable compositions of this invention will not uniformly crosslink in the presence of appreciable amounts of moisture, the thermosettable compositions of this invention are prepared using amine modified novolacs and aromatic polycarboxylic compounds, respectively, in substantially anhydrous form. The term "substantially anhydrous" has reference to the fact that a given material contains initially less than about 5 weight percent free water (based on total weight) and preferably less than about 1 weight percent thereof and most preferably less than about ½ weight percent thereof.

THE AMINE MODIFIED NOVOLAC STARTING MATERIAL

In general, any amine modified novolac resin known to the prior art having the above-described characteristics can be used in the compositions of this invention. Because of possible ambiguities in prior art teachings relating to production of amine modified novolacs, a brief discussion of the preparation and properties thereof are now given.

For purposes of this invention, "oxygen acetyl percent" of an amine modified novolac is conveniently determined by the method of Stroh and Liehr, J. Prakt. Chem. 29 (1–2), H. (1965).

Similarly, for purposes of this invention, "total acetyl percent" of an amine modified novolac is conveniently determined by the method of Siggia. Nitrogen acetyl percent is obtained by difference.

Typical beginning materials suitable for use in making amine modified novolac resins are:

(A) A phenol which has at least one unsubstituted reactive position on the aromatic nucleus, (B) An aromatic amine which has at least one primary amine group or at least one secondary amine group substituted on an aromatic nucleus, and (C) An aldehyde containing at least one aldehyde group.

The phenols which can be employed in this invention are aromatic alcohols which have at least one hydroxyl group directly attached to the aromatic nucleus and which have at least one unsubstituted reactive position on the aromatic nucleus. It is normally the case that the reactive positions on the aromatic nucleus are those which are ortho and para to the hydroxyl group. Therefore, phenols which have at least one unsubstituted position ortho or para to the hydroxyl group are particularly useful. Examples of representative and illustrative phenols which can be employed in this invention are given in Table I below:

TABLE I
Examples of Phenols

TABLE I—(cont'd.)

Examples of Phenols

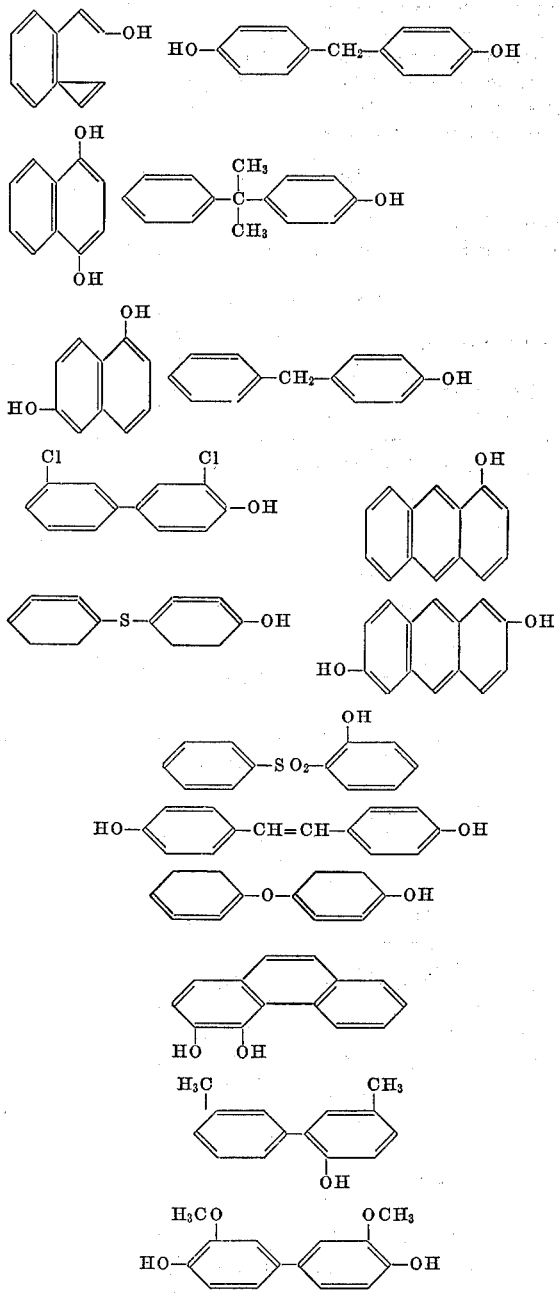

Preferred phenols are phenol itself, alkylphenols, and aryl phenols wherein substituents on this phenol benzene ring have a total of from 1 to 8 carbon atoms, and most preferably, from 1 to 6 carbon atoms.

The aromatic starting amines which can be employed can be of many different types. Thus, it can be a class represented by the formula:

(3) $\quad\quad\quad ArNH_2$ wherein Ar is an aryl group which has at least one unsubstituted reactive position on the aromatic nucleus. It can also be a class represented by the formula:

$$ArNH\!-\!R_5$$

wherein Ar is as just defined and $R_5$ is an alkyl radical, an aralkyl radical, an alkaryl radical, or the like. Preferably, in Formulas 3 and 4, Ar is a phenyl radical and $R_5$ contains less than 11 carbon atoms.

Ordinarily, in both Formula 3 and Formula 4 amines, the reactive positions are those which are ortho and para to the amino group. Accordingly, aromatic amines which have at least one unsubstituted position ortho or para to the amino group are preferred for use in preparing the condensation products employed in the invention. The presently most preferred aromatic amines are aniline, the alkyl-substituted anilines wherein the alkyl groups thereof have from 1 to 4 carbon atoms, and the alkyl-substituted diaminobenzenes wherein the alkyl groups thereof have from 1 to 4 carbon atoms. Examples of representative and illustrative aromatic amines of Formulas 3 and 4 above are given in Tables II and III, respectively, below:

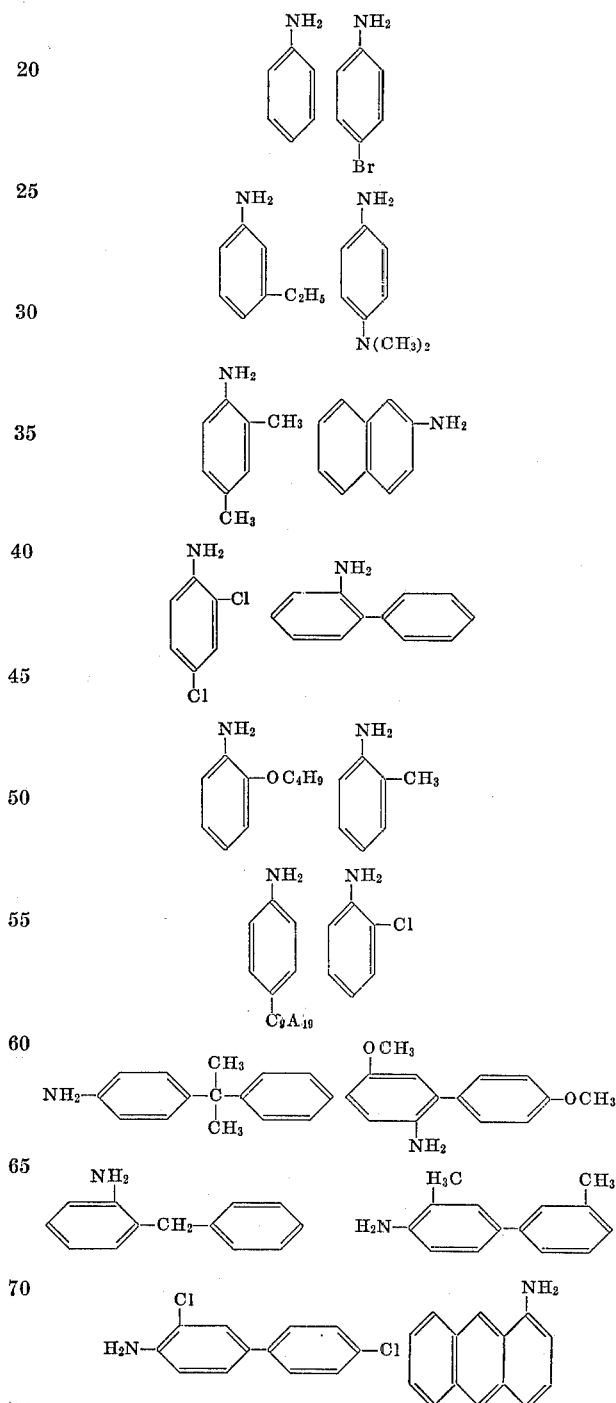

TABLE III—(cont'd.)
*Examples of Formula (4) Amines*

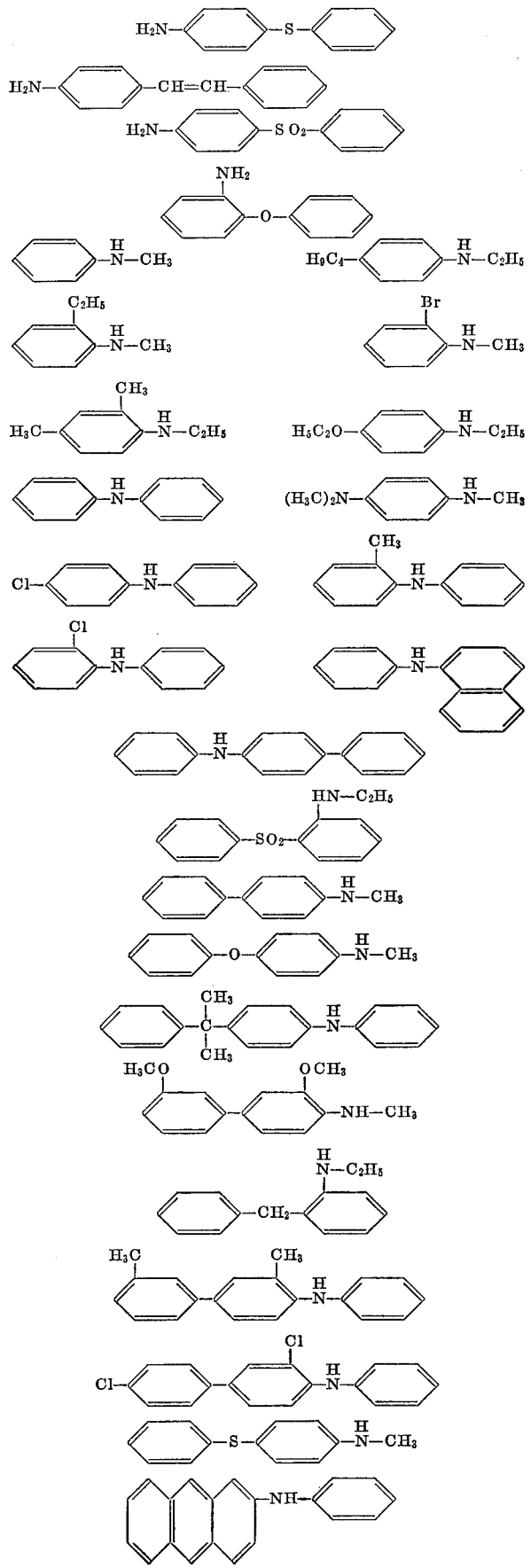

The amines operative in the present invention can be aromatic diamines. Both aromatic primary and secondary diamines are operative in the present invention, but the aromatic primary diamines are preferred over the secondary because the secondary diamines are less desirable as the thermal stability and hydrolytic stability are apparently less than the primary diamines. The diamines are of the general formula:

(5)  $H_2N—R_6—NH_2$ wherein $R_6$ is a divalent aromatic radical. Also operative are aromatic diamines having the general formula:

$H_2N—R_6—NHR_7$ wherein $R_6$ is as above defined and $R_7$ is an alkyl radical, an aryl radical, an aralkyl radical, an alkaryl radical, or the like. Preferably, $R_6$ is a phenyl radical and $R_7$ is a lower alkyl radical. Examples of representative and illustrative aromatic amines of Formulas 5 and 6 above are given in Tables IV and V, respectively, below:

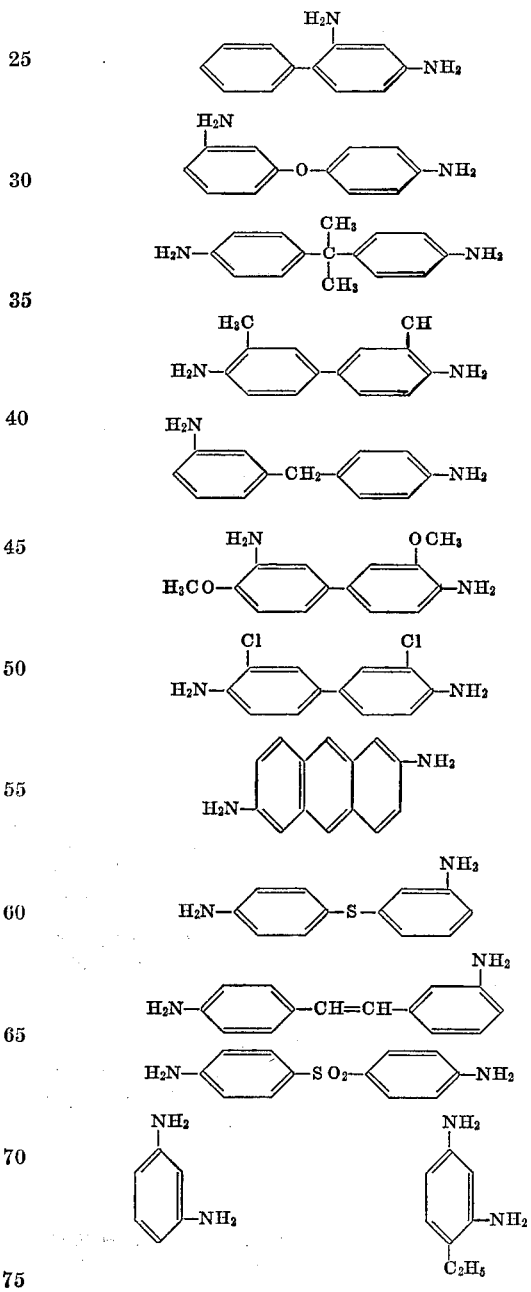

3,558,559
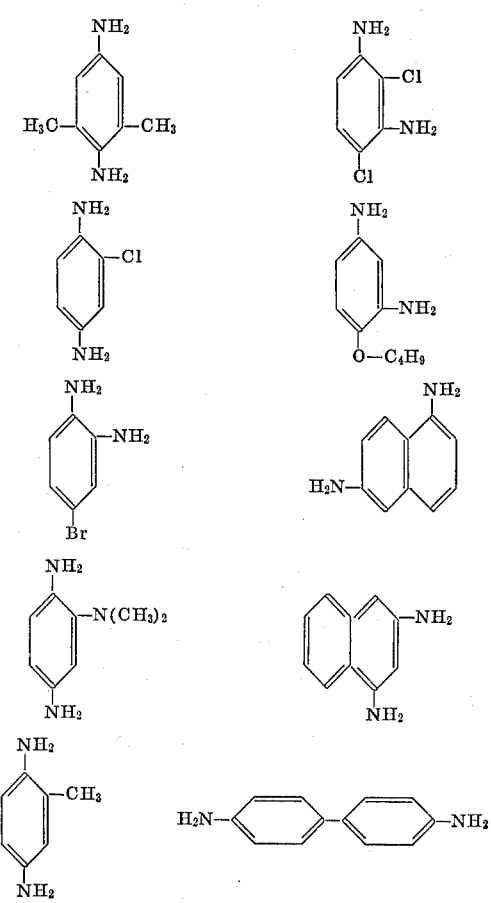
TABLE V
*Examples of Formula (6) Amines*
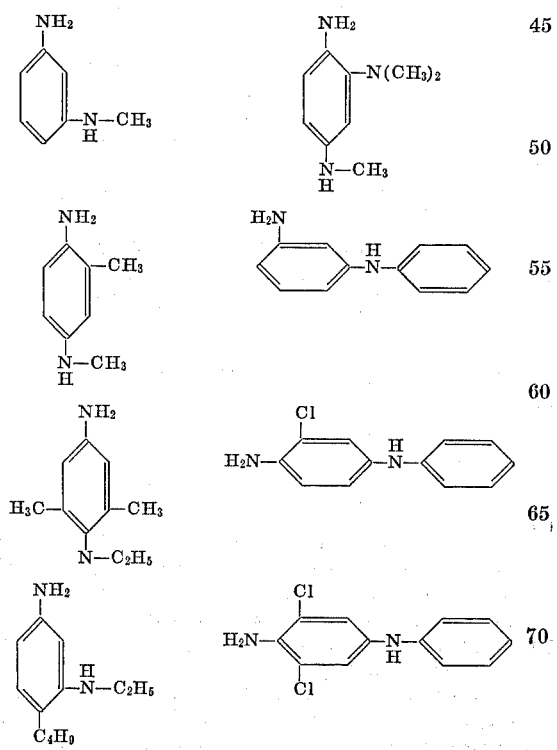
TABLE V—(cont'd.)
*Examples of Formula (6) Amines*
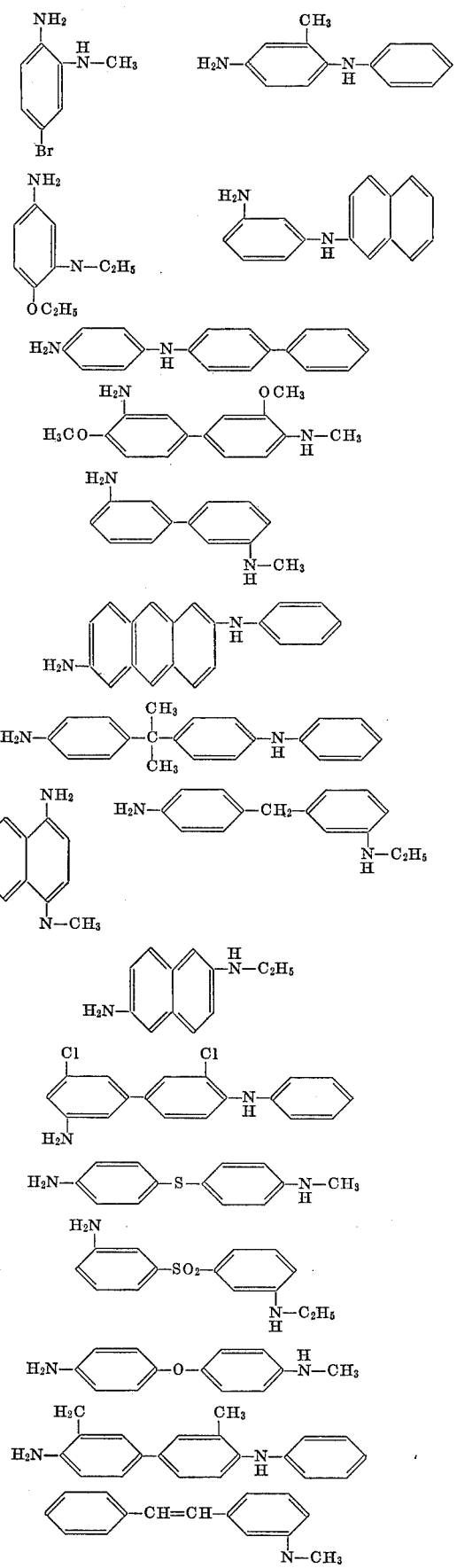

The aldehydes which can be employed are alkanals such as formaldehyde, acetaldehyde, propionaldehyde and the like, arylals such as benzaldehyde, salicylaldehyde, and the like, haloalkanols, such as chloral, and the like. Formaldehyde is preferred. The formaldehyde can be employed in water solution or dispersion, or in an organic solvent such as methanol. It is preferred to employ the formaldehyde in aqueous solution (such as the 37 weight percent aqueous solution known as formalin). Paraform can also be used.

Sometimes, if desired, the phenol and the aromatic amine can be combined into a single starting compound wherein the same aromatic nucleus has substituted thereon at least one hydroxyl group and at least one primary or secondary amine group. Similarly, if desired, the phenol and the aldehyde can be combined into a single starting compound wherein the same aromatic nucleus has substituted thereon at least one aldehyde group and at least one hydroxyl group. Similarly, if desired, the aromatic amine and the aldehyde can be combined into a single starting compound wherein the same aromatic nucleus has substituted thereon at least one aldehyde group and at least one primary or secondary amine group. Examples of such representative and illustrative polyfunctional starting materials are given in Tables VI, VII, and VIII below:

TABLE VI

*Examples of Aminophenol Compounds*

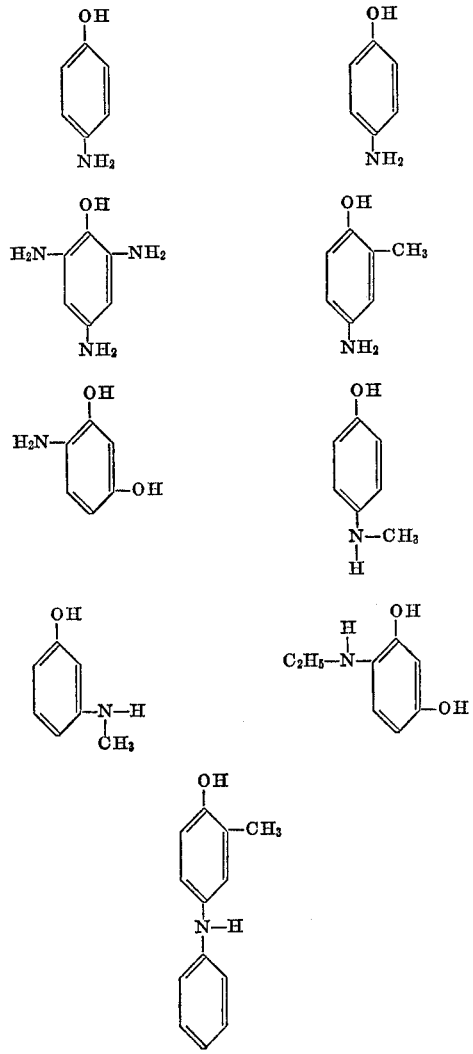

TABLE VII

*Examples of Aromatic Phenol-Aldehyde Compounds*

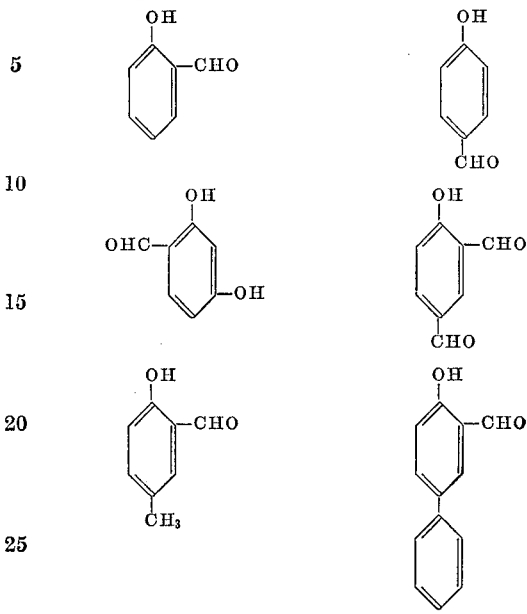

TABLE VIII

*Examples of Aromatic Amine Aldehydes*

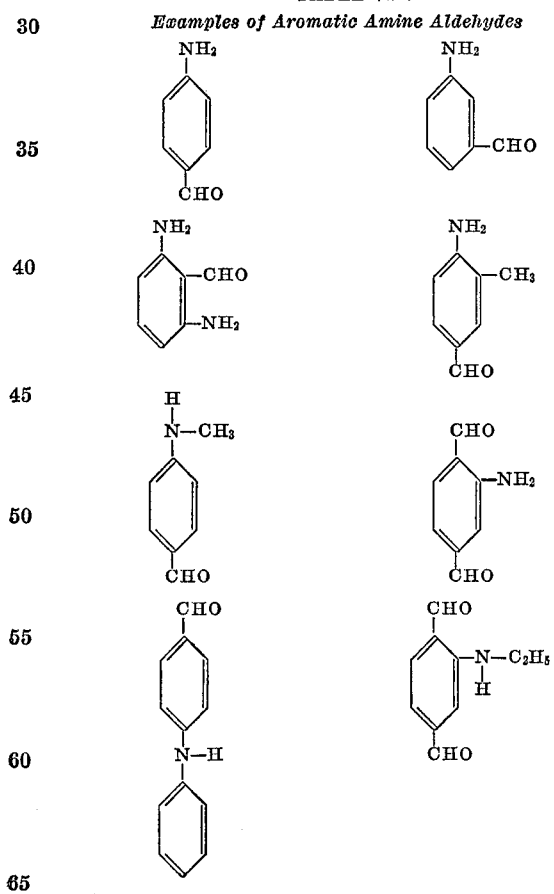

When such a composite polyfunctional starting material is employed, it is preferred to use such in admixture with an aromatic amine, a phenol, and an aldehyde. For example, one could employ up to about 50 weight percent of such a polyfunctional material in making an amine modified novolac.

When one makes an amine modified novolac resin using, for example, a phenol, an aromatic amine and an aldehyde, it is convenient and preferred to condense the starting materials under aqueous liquid phase conditions using heat and an acid catalyst. Conventional and preferred acid catalysts are organic carboxylic acids (mono or polybasic) which are relatively strong as respects their disassociation constants. Examples of suitable such acid catalysts include: aliphatic carboxylic acids, such as formic, propionic, oxalic, diglycolic, fumaric, itaconic, lactic, maleic, malonic, and the like, and aromatic mono and dicarboxylic acids, such as naphthoic, phthalic, salicyclic, and the like.

The amount of acid catalyst employed can vary but in general is sufficient to produce a pH in an aqueous liquid phase medium of from about 1.5 to 6.0 (preferably from about 2.0–4.0) but this is not necessarily a critical factor.

The proportion of reactants employed is likewise not necessarily a critical factor, and can be varied over a wide range. For example, the mol ratio of aromatic amine groups ot phenolic -OH groups ranges from about 90/1 to 1/90 and the mol ratio of aldehyde to the sum of aromatic amine groups plus phenolic-OH groups ranges from about 0.5 to 0.99. For instance, in a preferred specific embodiment, the charged mol ratio of aniline to phenol can range from about 95:5 to 5:95, though a more preferred range is from about 1:1 to 9:1. Sufficiently, and for example, the charged mol ratio of formaldehyde to the sum total of aniline and phenol is less than about 1:1. In general, the higher the aniline content, the higher the formaldehyde to combined aniline and phenol mol ratio can be without a generally undesirable gelation (because gelation substantially prevents post-working) occurring as a side phenomenon during condensation. To avoid gelation in making such a preferred embodiment, the following relationships can be used as guides:

TABLE 1

| At—Aniline/phenol mol ratio | Use—Formaldehyde to aniline plus phenol mol ratio |
| --- | --- |
| 1:1 | Smaller than 0.70:1. |
| 90:10 | Smaller than 0.95:1. |
| 60:40 | Smaller than 0.75:1. |
| 80:20 | Smaller than 0.80:1. |

For such a condensation, the acid catalyst is preferably formic acid, oxalic acid, or propionic acid in an amount of from about 0.5 to 5 parts catalyst per 100 parts phenol (by weight). The temperature of reactants in such preferred embodiment can vary from about 60° to 100° C. Agitation of reactions during condensation is preferably continuous. It is not necessary for the reactants to be charged together to a reactor thus, formaldehyde can be slowly added to a warmed mixture of aniline, phenol and acid catalyst. The entire condensation may be carried out at reflux temperatures if desired. Since a co-condensation reaction is apparently involved, the reaction mechanism, it is theorized, may involve formation of low molecular weight intermediates which initially form, and then possibly rearrange and combine with one another at a later stage. Typically, condensation reaction conditions are maintained until all aldehyde is consumed.

In general, conventional equipment can be employed for the condensation reaction. For example, a reaction kettle equipped with agitator, means for reflux and distillation, nitrogen inlet means, and conventional heat transfer means is suitable. The material of construction can be steel, stainless steel, glass, Monel, or the like.

In general, a preferred method for carrying out the condensation reaction of the phenol, aldehyde, and amine starting materials is to add the aldehyde slowly to an agitated mixture of phenol and aromatic amine containing the acid catalyst. This mixture is maintained at a temperature of from about 50° C. to about 125° C., and preferably from about 70° C. to about 105° C. during the addition. After the addition of aldehyde, which can take from about one hour to about four hours or longer, the condensation reaction is continued for about 30 minutes to about 3 hours at a reaction temperature of from about 50° C. to about 125° C., and preferably, from about 95° C. to about 100° C. At the end of the reaction period, the condensation product can then be recovered by stripping off water and unreacted reagents under reduced pressure at temperatures from about 110° C. to about 200° C., and preferably, from about 140° C. to about 170° C.

Another method for carrying out the condensation reaction is to methylolate a phenol (monomethylolation) by reacting a phenol with an aldehyde under base catalysis at temperatures of from about 50° C. to about 110° C., and preferably from about 60° C. to about 80° C. The reaction mixture is then made (slightly) acidic (if not already so) and the aniline is added and condensed with the foregoing at temperature of from about 50° C. to about 125° C., and preferably, from about 95° C. to about 100° C. At the end of the reaction period, the condensation product can be recovered by stripping off water and unreacted reagents under reduced pressure at temperatures from about 110° C. to about 200° C. and preferaly, from about 140° C. to about 170° C. Yet another method for carrying out the condensation reaction is to make a phenolic novolac resin using the well known acid catalyzed reaction of phenol and aldehyde. The unrecovered phenolic resin (containing water and unreacted phenol) is then made mildly acidic (if not already so) and the aromatic amine added. The final condensation is then carried out by adding further aldehyde to the foregoing mixture while being maintained at a temperature of from about 50° C. to about 125° C., preferably, from about 95° to about 100° C. At the end of the reaction period, the condensation product can be recovered by stripping off water and unreacted reagents under reduced pressure at temperatures from about 110° C. to about 220° C., and preferably, from about 140° C. to about 170° C.

In general, as first prepared, the amine modified novolac is typically an aqueous solution or dispersion, the exact conditions and respective quantities and types of reactions in any given instance being determinative of the character of the product (including degree of advancement, color, etc.). The amine modified phenolic resin can be concentrated (and even prepared as a solid resin) and impurities such as unreacted reactants largely removed by means of dehydration under vacuum. As those skilled in the art appreciate, typical dehydration conditions are distillation under about 28 inches mercury vacuum until batch temperature reaches about 160° C. though any convenient conditions can be employed.

Yields of amine modified novolac resin typically vary from about 85 to 110 percent (based on combined starting (charged) weights of aromatic amine and phenol.) In general, higher aromatic amine mol ratios, as well as higher aldehyde to phenol plus aromatic amine ratios give higher yields. Aniline-phenol-formaldehyde resins prepared as just described generally have the above-described characteristics and constitute a preferred class of amine modified phenolic resins suitable for use in the present invention.

In general, for use in the present invention, amine modified novolac resins are prepared in the form of substantially anhydrous starting materials, as explained above.

An advantage in dehydrating a starting amine modified novolac is that the dehydration procedure (using heat and reduced pressure as described above) typically also tends to remove impurities from a starting resin, such as unreacted started materials, catalysts, etc.

THE AROMATIC POLYCARBOXYLIC COMPOUNDS

Turning to the aromatic polycarboxylic compounds of Formula 2, it will be appreciated that $R_2$, the monovalent hydrocarbon radical, is not a critical function in the present invention, and may be any monovalent alkyl, aryl, or even a cycloalkyl, halogenoalkyl, halogenoaryl or other halo-substituted radical (preferred chloro). The preferred monovalent hydrocarbon radicals are alkyl radicals, especially those containing from 1 through 10 carbon atoms. The aromatic carbonyl-containing compound must contain at least two carbonyl-containing groups in the ortho position. The anhydride groups, each with a valence of two, and each containing two carbonyl-containing groups, are always attached to adjacent carbon atoms on an aromatic ring. The Formula 2 compounds can contain any combination of anhydride, acid, or ester groups, as defined in Formula 2. A preferred number of carbonyl-containing groups per molecule is four, such as two anhydride groups, four ester groups, or combination of any four of these carbonyl-containing groups. A particularly preferred aromatic carbonyl containing compound is trimellitic acid anhydride. The aromatic radicals must each contain at least two carbonyl-containing groups attached to adjacent carbon atoms whereas the other carbonyl-containing groups can be on any other ring position.

As a class, the compounds of Formula 2 are known, as are methods for their preparation (so details concerning the latter are not given herein).

Examples of representative and illustrative aromatic polycarboxylic compounds of Formula 2 are given in Tables IX and X below:

TABLE IX

Examples of Formula (2) Anhydride Compounds

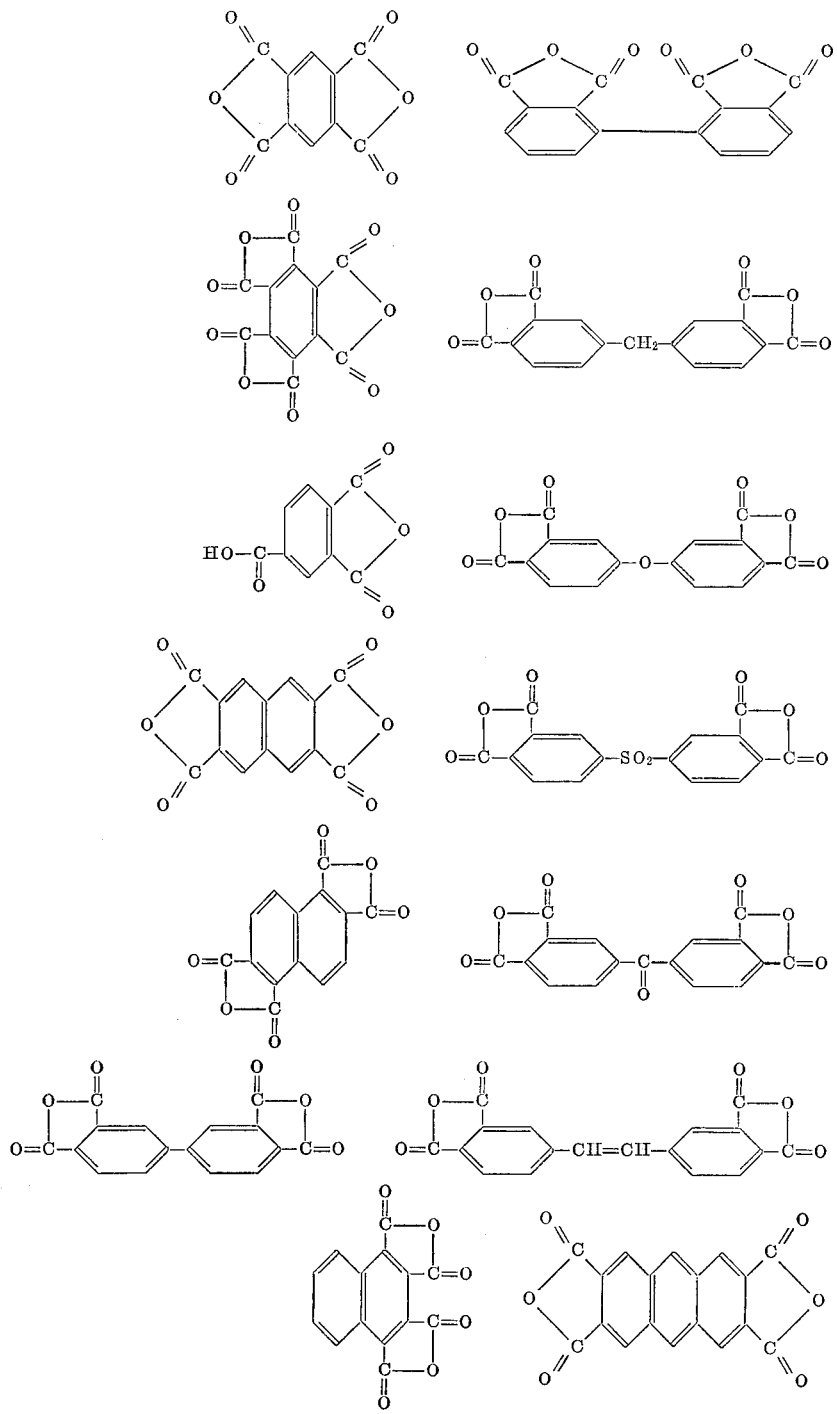

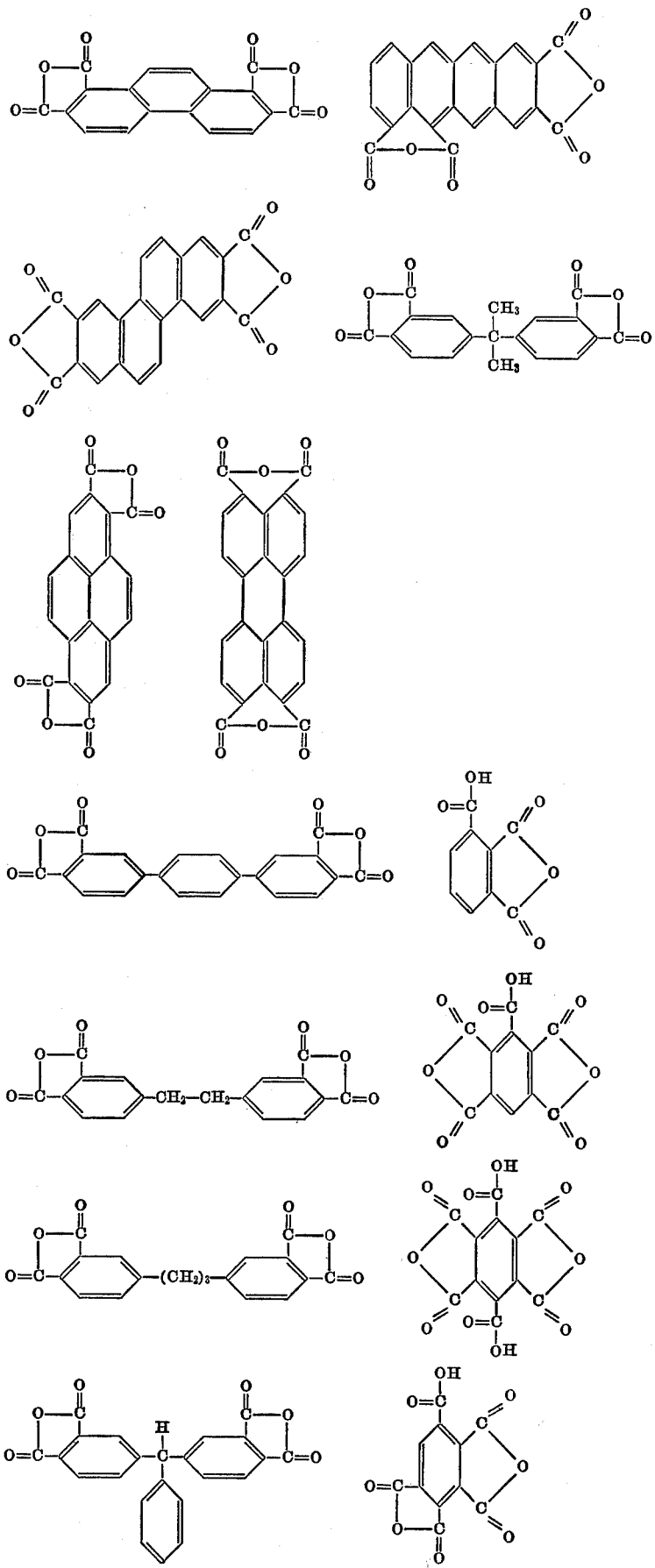

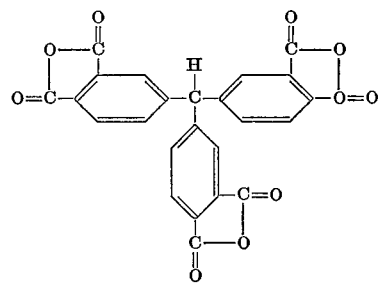
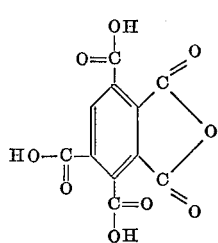
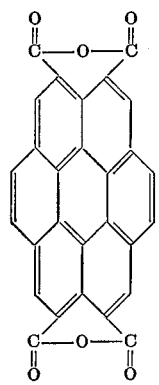
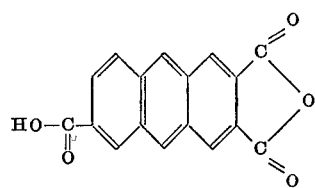
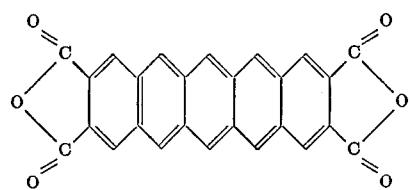
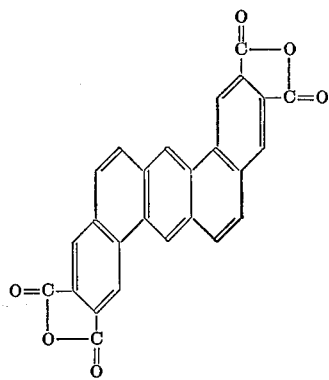
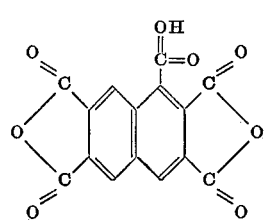
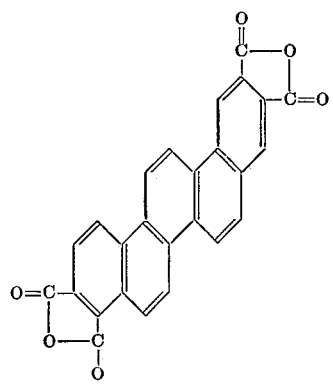
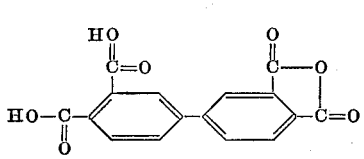

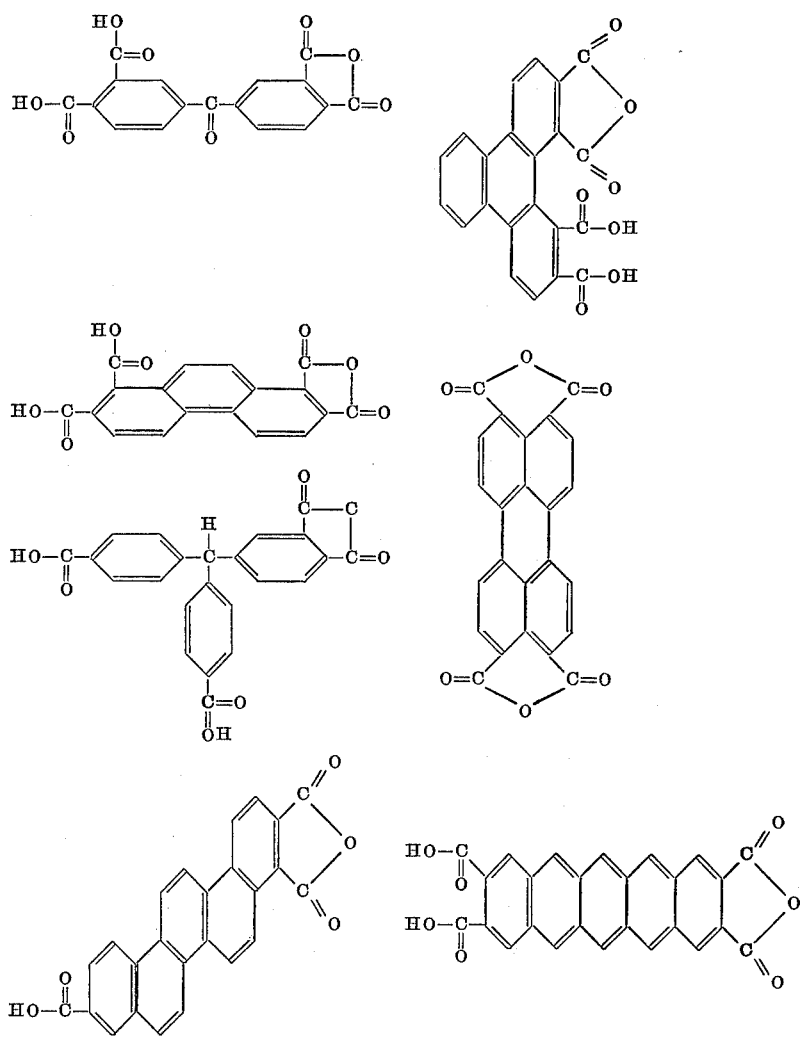
TABLE X
*Examples of Formula (2) Esters and Half Esters*
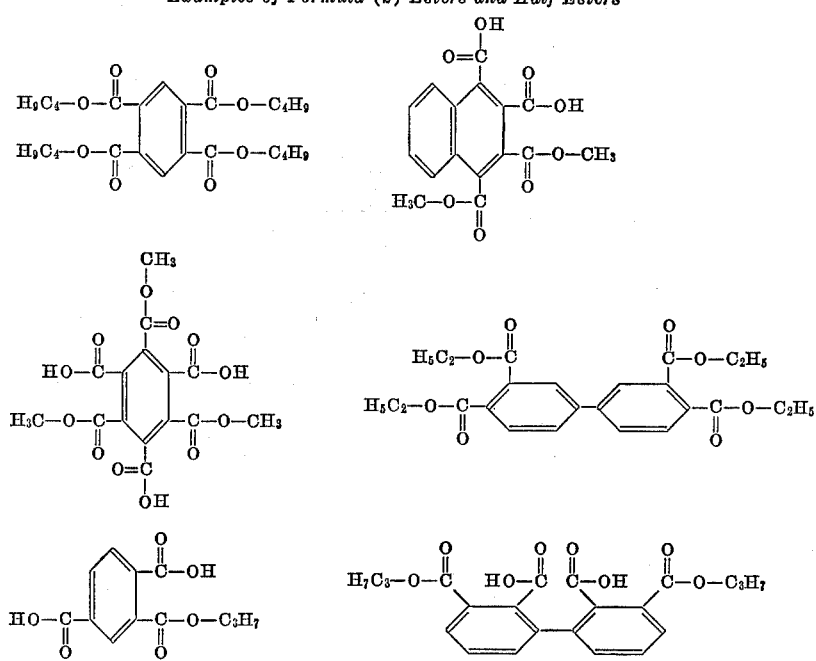

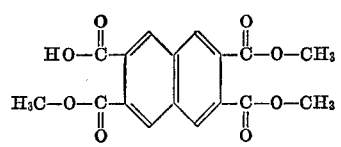
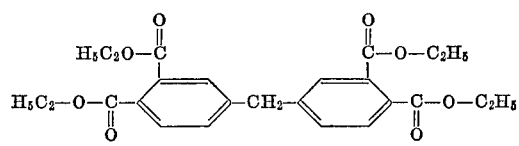
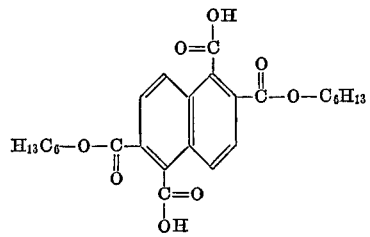
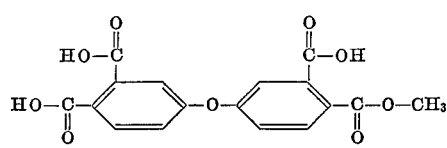
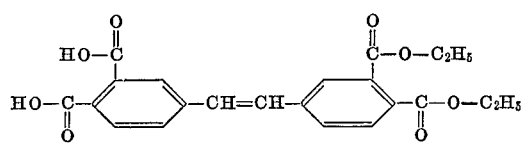
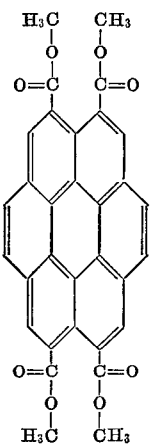
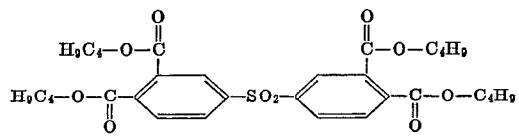
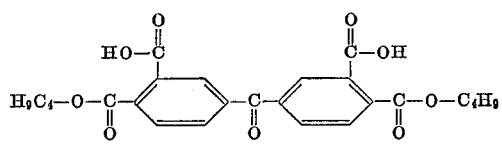
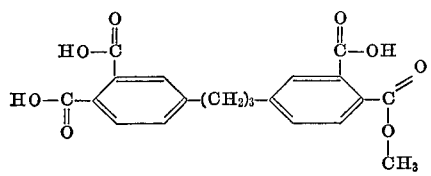
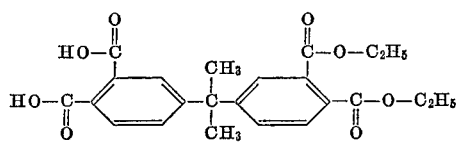
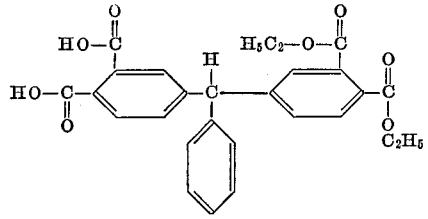
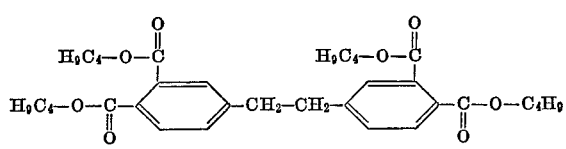
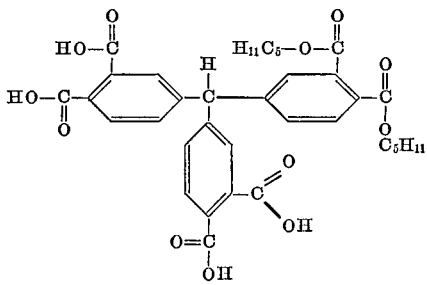
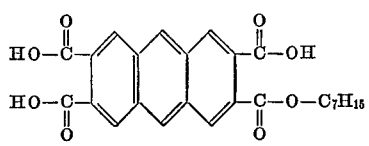
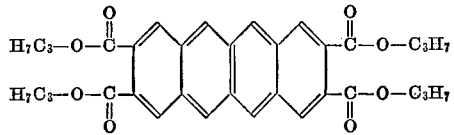

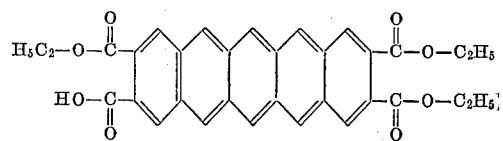
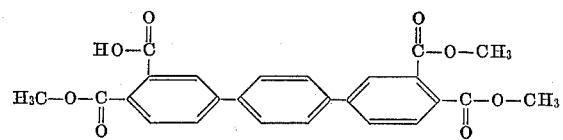
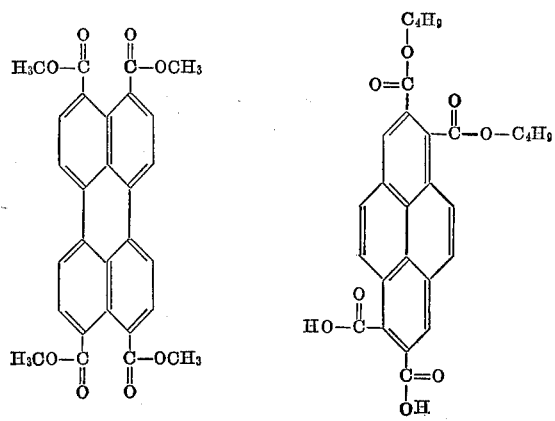
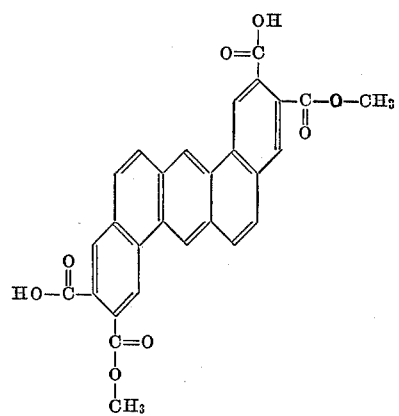
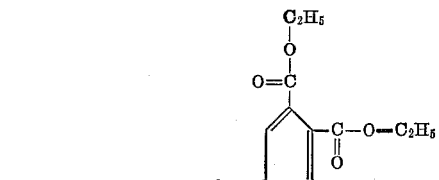
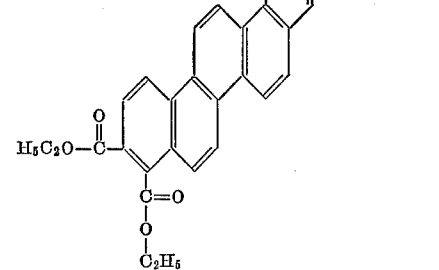
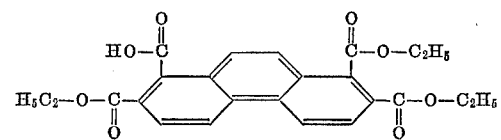

In general, for use in the present invention, aromatic polycarboxylic compounds are prepared in the form of substantially anhydrous starting materials, as explained above.

PREPARATION OF COMPOSITIONS

To make a thermosettable resinous composition of this invention, one takes an amine modified novolac resin as described above and an aromatic polycarboxylic compound as described above and simply mixes the two components together until a substantially uniform product mixture is obtained. The relative proportions of each are as described above.

In general, the proportion of aromatic polycarboxylic compound to amine modified novolac resin in any given thermosettable composition is such that the composition will thermoset when exposed to an elevated temperature, e.g., a temperature of 150° C. or higher. Preferably, the proportion of aromatic polycarboxylic compound to amine modified novolac resin is such that amide, imide, and/or ester linkages can be formed at each amine hydrogen and each phenolic hydroxyl site within each amine modified novolac resin molecule. However, thermosettability is frequently achievable by using less than all such amine hydrogen and phenolic hydroxyl sites when crosslinking with an aromatic polycarboxylic compound such as taught in this invention. Also, thermosettability is not appreciably affected, within wide limits, by using excesses of stoichiometric amounts of aromatic polycarboxylic compounds in relation to a given quantity of another modified novolac resin. During thermosetting, it should be noted that at higher temperatures, e.g., temperatures say above 200° or more, typically, though not necessarily, rearrangements can occur in the thermoset material which result in a higher concentration of one form of linkage as opposed to another. For example, it is tentatively theorized (and there is no intent to be bound by theory herein) that at higher temperatures, rearrangement to form imide linkages is common in a given thermoset product of this invention.

In general, the thermosettable resinous compositions of this invention, owing to the initial substantially dehydrated character of each of the amine modified novolac resin and of the aromatic polycarboxylic compounds, respectively, employed in these compositions, are in the form of either powders which are characteristically free flowing, or liquids which are in the form of solutions of dispersions with the liquid medium thereof being organic and substantially anhydrous in character.

When making a solid, thermosettable composition of this invention, it is preferred to use an amine modified novolac resin and an aromatic polycarboxylic compound (as described above, respectively) in the form of solids which have particle sizes generally under about 100 mesh (U.S. Standard sieves). Preferably, particle sizes under about 50 mesh are used. The admixing of one component with the other can be made in a blender, such as a so-called Waring Blendor, a ball mill, or the like, although any convenient mechanical mixing means may be employed.

On the other hand, when preparing a liquid thermosettable composition of this invention, either or both the amine modified novolac or the aromatic polycarboxylic compound may initially be in a solid or a liquid form. Thus, the amine modified novolac resin even in its substantially anhydrous form may be in a liquid condition. Although the aromatic polycarboxylic compound even in its dehydrated form may also be in a liquid condition, typically such aromatic polycarboxylic compound is in the form of a high melting solid.

As indicated, an organic liquid is used to dissolve or disperse either or both the amine modified novolac resin and the aromatic polycarboxylic compound. In general, the organic liquid used is one which is:

(1) Substantially inert (as respects each of the amine modified novolac resin and the aromatic polycarboxylic compound), (2) Boils below about 250° C. (preferably 150° C.) at atmospheric pressures, (3) Is a mutual dispersant for both the amine modified novolac resin and the aromatic polycarboxylic compound, and (4) Is substantially single phased.

By the term "mutual dispersant" as used herein reference is had to the fact that a given organic liquid is capable of acting either as a solvent and/or as a colloidal suspending medium for the amine modified novolac resin and for the aromatic polycarboxylic compound in a product thermosettable composition of this invention. As used herein, the term "colloidal" in reference to a suspension or dispersion has reference to suspended or dispersed solid particles which are under about 200 millimicrons in average maximum individual particle size dimension.

By the term "substantially single phased" reference is had to the fact that a given organic liquid exists in a liquid composition of this invention as one phase.

While the organic liquid used has properties as indicated above. It will be appreciated that such a liquid in a particular composition of the invention can comprise mixtures of two or more chemically different organic liquids. For example, one can preliminarily dissolve or disperse the amine modified novolac resin in one particular liquid and the aromatic polycarboxylic compound in another particular organic liquid, and then thereafter mix the two resulting such organic liquids together. Obviously, when one uses such a mixture of different organic liquids, the liquids are so chosen as to be mutually intermiscible with one another at least in the respective amounts of the individual organic liquids employed in a given product mixture in order to obtain a compatible one phase liquid medium.

It is desirable and preferred to have a single phase organic liquid in liquid thermosettable compositions of this invention because of the possibility of having a concentration either of aromatic polycarboxylic compound or of amine modified novolac resin which is greater in one liquid phase than in the other. Such a concentration differential could possibly lead to irregularities and nonuniformities in a thermoset composition derived therefrom, as those skilled in the art will appreciate.

Preferred organic liquids (especially when one is using) as the organic liquid a single chemical entity, are lower alkanones, such as acetone, methyl ethyl ketone or higher ketone. On the other hand, when one uses as the organic liquid a mixture of different organic entities, one can employ as preferred liquids lower alkanols (such as ethanol or methanol, aromatic and aliphatic) (including cycloaliphatic hydrocarbons), including benzene, toluene, xylene, naphthalene, nonane, octane, petroleum fractions, etc. Conveniently, some of the organic liquid present can be excess alcohol left over from an esterification reaction involving an aromatic polycarboxylic compound. Any given organic liquid used in a composition of this invention is substantially anhydrous, as indicated above.

Preferably, the amine modified novolac resin starting materials are substantially completely dissolved in the organic liquid phase of a liquid composition of this invention. If not so dissolved, the nondissolved portion thereof is in the form of a colloidal dispersion or suspension of particles. Preferably, at least 80 percent of the amine modified novolac resin is completely dissolved in the organic liquid and more preferably such resin is substantially completely dissolved in the organic liquid.

Similarly, the aromatic polycarboxylic compound starting materials are substantially completely dissolved in the organic liquid phase of a liquid composition of this invention. If not so dissolved, the nondissolved portion thereof is in the form of a colloidal dispersion or suspension of particles. Preferably, at least 80 percent of the aromatic polycarboxylic compound is completely dissolved in the organic liquid and more preferably such resin is substantially completely dissolved in the organic liquid.

Those skilled in the art will appreciate that orginic solvents can be added to a given liquid composition of this invention to improve the quantity of respective starting materials in true solution. For example, adding a ketone or an ester ether solvent, or even a so-called "super" solvent, such as dimethyl formamide, will generally improve the ability of a given composition to dissolve both classes of component starting materials. If dimethyl formamide is employed, it is preferred to use not more than about 20 weight percent of this material based on total organic liquid weight in a given liquid composition.

The respective concentrations of the amine modified novolac resin and of the aromatic polycarboxylic compound in a given liquid composition of this invention relative to the total amount of organic liquid present can vary over extremely wide ranges. A rough but practical indication of the concentration of the respective starting materials in a given liquid composition is given by the viscosity of such a composition. A correlation between viscosity and particular contemplated end use can sometimes be made, as those skilled in the art will readily appreciate. Characteristically, though not limitatively, a liquid composition of this invention can have viscosities ranging from about 10 to 5000 centipoises. For impregnating applications, viscosities of from about 50–500 centipoises are usually preferred. The total solids content of a given liquid composition can be as high as about 75 weight percent or even higher, and as low as about 20 weight percent or even lower. Preferred solids contents usually fall in the range of from about 50 to 70 weight percent as those skilled in the art will readily appreciate.

Liquid compositions of this invention can be advanced (e.g., cross-linked as by heating) to some extent without forming precipitates from the organic liquid. Advancing can be accomplished if desired by heating at temperatures generally in the range of from about 70 to 100° at atmospheric pressures for times typically in the range of from about 20 to 30 minutes or even longer, care being taken not to cause solid material to precipitate.

In both the solid and the liquid compositions of this invention, it will be appreciated that the ratio of amine modified novolac resin to aromatic polycarboxylic compounds is as indicated above. However, mixtures of different amine modified novolac resins and of different aromatic polycarboxylic compounds can be employed in any given composition to enhance characteristics desired for a particular end use application as those skilled in the art will readily appreciate.

Those skilled in the art will readily appreciate that various conventional additives can be composited with the solid or liquid compositions of this invention to promote effectiveness for particular end uses. For example, one can add dyes, colorants, release agents, fungicides, coupling agents, and the like.

In the case of the powdered products of this invention, one can add particulate solid diluent materials to produce molding compositions. For example, a typical molding composition using a composition of this invention contains from about 25 to 40 weight percent of a composition of this invention, and correspondingly, from about 60 to 75 weight percent of particulate inert diluent. A molding composition typically contains in addition from about 1 to 2 weight percent of a lubricant and from about 1 to 2 weight percent of a colorant, though relatively higher percentages of these last indicated components can be present herein.

USES

As indicated above, the solid compositions of this invention can be used as molding powders. In general, conventional molding powder technology can be employed in the utilization of such solid compositions. Sometimes it is desirable in order to avoid blistering to cool a given mold as those skilled in the art will appreciate. The solid resins can also be used to bond aluminum oxide grits commercially utilized in abrasives.

The liquid compositions of this invention find use for impregnation and reinforcing purposes. Thus, the liquid compositions can be used to impregnate cellulosic paper, asbestos paper and other known woven sheet structures as well as woven fabrics (such as glass fibers, cotton fibers, nylon fibers, etc.) and the like. Impregnation can be accomplished by any conventional or convenient means including dipping, coating, spraying, or the like. The so-impregnated material is conventionally air-dried to lower the volatiles content and then is heated to advance the composition of this invention to a particular desired degree for the ultimate intended use. The so-impregnated sheet materials are themselves particularly useful in the manufacture of laminates. Such laminates, such as those made from impregnated sheet materials as indicated above are useful in electrical applications as supports or as insulation for conductive elements. The laminates so made are particularly characterized by superior heat resistance and thermal stability characteristics. The laminates are generally manufactured in a sheet or block form which is then machined to provide desired configuration for a particular end use.

Oil filters, such as for use in automobiles, can be prepared from the impregnated sheet members produced as generally described above. For example, one can impregnate with a liquid composition of this invention, cellulosic papers modified with a synthetic fiber such as a polyester or the like and having a thickness of from about 5 to 20 mils. Sufficient liquid composition is used to impregnate such a sheet member so that the product sheet member when cured has a resin content of from about 15 to 25 weight percent based on the total product weight. After such a paper is impregnated, it is typically heated to partially advance the resin composition, and then is corrugated or pleated to form a filter element. The filter element is then assembled with an end use filter condenser and the whole assembly is heated to say from about 250 to 350° F. for from about 5 to 20 minutes to cure the resin. When cured, the product has excellent high temperature characteristics.

In addition, a liquid composition of the present invention can be used to make reinforced plastics.

In this invention, all solids in liquids are conveniently measured using ASTM Test Procedure D115–55.

EMBODIMENTS

The following examples are set forth to illustrate more clearly the principles and practices of this invention to one skilled in the art and they are not intended to be restrictive but merely to be illustrative of the invention herein contained. Unless otherwise stated therein, all parts and percentages are on a weight basis.

EXAMPLE A

Preparation of amine modified phenolic resin a 2½ hour period, 915 grams (15.25 moles) of 50 weight formic acid is added and allowed to mix. Next, over about nel. At 70° C., 26.6 grams (0.52 mole) of 90% strength
A mixture of 1005 grams (10.7 moles) of phenol and 995 grams (10.7 moles) of aniline is heated to 70° C. in a 5-liter, 3-neck Pyrex reaction flask that is equipped with stirrer, thermometer, reflux condenser and dropping funpercent aqueous formaldehyde solution is added to the reaction mixture while stirring vigorously. The reaction mixture is refluxed for 45 minutes at about 100° C. The reaction flask is then changed over to vacuum distillation conditions and vacuum slowly applied up to about 7" Hg (temperature stabilized at about 90° C.). As the temperature reached about 95° C. (with about 7" Hg vacuum), the vacuum is increased slowly to about 10″ Hg. As the temperature reached about 100° C., the vacuum is increased slowly to about 20″ Hg. When the temperature reached about 110° C., the vacuum is increased slowly to 28″ Hg. The temperature is then allowed to rise to 160° C. with 28″ Hg of vacuum while continuing to distill. At 160° C., the distillation is stopped and the product poured into a pan to cool. The resulting amine modified phenolic resin is a clear, brittle, glasslike solid at room temperature. The distillate has two phases; the lower layer being mostly phenol and aniline and the upper layer being mostly water. The yield of solid resin is about 88 percent based on the sum of the phenol and aniline charge.

EXAMPLES B THROUGH K

Following the same general procedure described in Example A, a series of amine modified phenolic resins are prepared from phenol, aniline, and formaldehyde. Table I below describes each resin.

EXAMPLES L THROUGH U

Following the same general procedure described in Example A, a series of amine modified phenolic resins are prepared using various substituted phenols and aromatic amines. Table II below describes such resin.

comes clear. Upon allowing it to cool slowly, it starts to become opaque at about 80° C. and is a white colored, almost solid material at room temperature. Yield: about 894 grams.

EXAMPLE X

Preparation of mixed ½ dipropyl ester of benzophenone tetracarboxylic acid dianhydride and trimellitic anhydride solution A mixture of 2000 grams (33.3 moles) of n-propyl alcohol, 1000 grams (3.11 moles) of benzophenone tetracarboxylic acid dianhydride (BTDA) and 1000 grams (5.21 moles) of trimellitic anhydride (TMA) is heated over a period of about one hour to about 105° C. in a 5-liter, 3-neck Pyrex reaction flask that is equipped with stirrer, thermometer and reflux condenser. At about 102° C., the foregoing mixture becomes clear. Upon allowing it to cool slowly, it starts to become cloudy at about 75° C. and is a white colored liquid dispersion of medium viscosity at room temperature. Yield: about 4000 grams.

EXAMPLE Y

Preparation of solid ½ butyl ester of benzophenone tetracarboxylic acid dianhydride A mixture of 505 grams (6.82 moles) of n-butyl alcohol and 1095 grams (3.40 moles) of benzophenone tetra-

TABLE I

| | Example | | | | | | | | | |
|---|---|---|---|---|---|---|---|---|---|---|
| | B | C | D | E | F | G | H | I | J | K |
| Molar ratio of aniline to phenol | 1/3 | 1/1 | 3/2 | 3/2 | 2/1 | 3/1 | 4/1 | 9/1 | 9/1 | 10/1 |
| Molar ratio of formaldehyde to aniline plus phenol | 0.60/1 | 0.71/1 | 0.725/1 | 0.752/1 | 0.71/1 | 0.71/1 | 0.75/1 | 0.93/1 | 0.99/1 | 0.99/1 |
| Catalyst | (1) | (2) | (1) | (3) | (2) | (1) | (1) | (3) | (1) | (1) |
| Percent yield (based on aniline plus phenol charged) | 82 | 88 | 94 | 88 | 96 | 98 | 96 | 106 | 110 | 111 |

1 Formic acid.
2 Propionic acid.
3 Oxalic acid.

TABLE II

| | Example | | | | | | | | | |
|---|---|---|---|---|---|---|---|---|---|---|
| | L | M | N | O | P | Q | R | S | T | U |
| Molar ratio of phenol | 3.39/1 | 2.74/1 | 2.42/1 | 1.11/1 | 2.06/1 | 1.52/1 | 2.32/1 | 1.96/1 | 1.32/1 | 3.68/1 |
| Identification of phenol | (1) | (2) | (3) | (4) | (5) | (5) | (6) | (7) | (4) | (8) |
| Identification of aromatic amine | (9) | (9) | (9) | (10) | (9) | (10) | (9) | (9) | (11) | (9) |
| Molar ratio of formaldehyde to aromatic amine plus phenol | 0.725/1 | 0.725/1 | 0.725/1 | 0.725/1 | 0.725/1 | 0.725/1 | 0.725/1 | 0.725/1 | 0.725/1 | 0.725/1 |
| Catalyst | (12) | (12) | (12) | (12) | (12) | (12) | (12) | (12) | (12) | (12) |

1 p-Nonyl phenol.
2 p-Phenyl phenol.
3 t-Butyl phenol.
4 Phenol.
5 p-Chloro phenol.
6 α-Naphthol.
7 3,5-xylenol.
8 Bisphenol A.
9 Aniline.
10 o-Chloroaniline.
11 O-toluidine.
12 Formic acid.

EXAMPLE V

Preparation of ½ dibutyl ester of benzophenone tetracarboxylic acid dianhydride solution A mixture of 1500 grams (20.3 moles) of n-butyl alcohol and 1250 grams (3.88 moles) of benzophenone tetracarboxylic acid dianhydride (BTDA) is heated over a period of about one hour to about 125° C. in a 5-liter, 3-neck Pyrex reaction flask that is equipped with stirrer, thermometer and reflux condenser. At about 123° C., the foregoing mixture becomes clear. It is then allowed to cool slowly to room temperature at which temperature it remained a clear, amber colored liquid of medium viscosity. Yield: about 2750 grams.

EXAMPLE W

Preparation of ½ butyl ester of trimellitic anhydride

A mixture of 478 grams (6.45 moles) of n-butyl alcohol and 416 grams (2.65 moles) of trimellitic anhydride (TMA) is heated over a period of about one hour to about 115° C. in a 5-liter, 3-neck Pyrex reaction flask that is equipped with stirrer, thermometer, and reflux condenser. At about 113° C., the foregoing mixture becarboxylic acid dianhydride (BTDA) is heated over a period of about one hour to about 150° C. in a 3-liter, 3-neck Pyrex reaction flask that is equipped with stirrer, thermometer and reflux condenser. At about 145° C., the foregoing mixture becomes clear. It is then allowed to cool slowly to about 130° C. Vacuum is applied up to about 28″ Hg and the resinous mixture distilled until the temperature reached about 160° C. The resulting condensation product is a clear, brittle, glasslike solid at room temperature which shows a tendency to become sticky in the presence of moisture. Yield: about 1425 grams.

EXAMPLE Z

Preparation of tetrahexyl ester of pyromellitic dianhydride

A mixture of 2448 grams (24 moles) of n-hexyl alcohol, 655 grams (3 moles) of pyromellitic dianhydride (PMDA) and 15 grams (0.08 mole) of p-toluene sulfonic acid is refluxed at about 160° C. for 8 hours in a 5-liter, 3-neck Pyrex reaction flask that is equipped with stirrer, thermometer and reflux condenser. The water formed is removed by distillation. The product is a liquid of low viscosity.

EXAMPLES OF COMPOSITIONS OF THE INVENTION

Example 1

Preparation of thermosetting varnish from amine modified phenolic resin and an aromatic polycarboxylic compound A 50 percent resin solution is made by dissolving 1000 grams of the solid resin from Example A in 1000 grams of Cellosolve. Alternatively, this solution is made by adding the solvent to the molten resin at the end of the resin distillation cycle. The resulting solution is a clear, amber colored liquid of medium viscosity. To this solution is added 1540 grams of ½ dibutyl ester of benzophenone tetracarboxylic acid dianhydride solution from Example V. With sufficient mechanical blending, the mixture gave a clear, amber color varnish. When a small amount (1-2 grams) is placed on a hot plate at about 180° C., this varnish cures to a hard thermoset resin following evaporation of the solvent. Properties of this varnish are as follows: Viscosity about 600 cps., ASTM solids about 66 percent and G.E. gel time about 23 minutes.

EXAMPLES 2-11

Following the the same procedure described in Example 1, a series of varnishes are prepared from amine modified phenolic resins and aromatic polycarboxylic compounds. Table III below describes each resin.

TABLE III

| | Example Number | | | | | | | | |
|---|---|---|---|---|---|---|---|---|---|
| | 2 | 3 | 4 | 5 | 6 | 7 | 8 | 9 | 10 |
| | Resin Identification | | | | | | | | |
| | B | C | D | D | D | E | F | G | J |
| Part A: | | | | | | | | | |
| Solvent | (¹) | (¹) | (¹) | (¹) | (¹) | (²) | (³) | (¹) | (⁴) |
| Resin concentration, percent | 50 | 60 | 50 | 50 | 50 | 50 | 50 | 60 | 60 |
| Part B: | | | | | | | | | |
| Aromatic polycarboxylic compound identification | V | X | V | W | Z | W | V | X | V |
| Ratio by weight of A to B in final varnish | 3.1/1 | 1.2/1 | 1.3/1 | 1.6/1 | 1/1 | 1.6/1 | 1.2/1 | 0.8/1 | 0.7/1 |

| | Example Number | | | | | | | | |
|---|---|---|---|---|---|---|---|---|---|
| | 11 | 12 | 13 | 14 | 15 | 16 | 17 | 18 | 19 |
| | Resin Identification | | | | | | | | |
| | L | M | N | O | P | R | S | T | Y |
| Part A: | | | | | | | | | |
| Solvent | (⁵) | (⁴) | (⁶) | (⁴) | (⁶) | (¹) | (⁴) | (⁴) | (⁴) |
| Resin concentration, percent | 50 | 50 | 50 | 50 | 50 | 50 | 50 | 50 | 50 |
| Part B: | | | | | | | | | |
| Aromatic polycarboxylic compound identification | V | W | W | V | V | V | V | W | V |
| Ratio by weight of A to B in final varnish | 1/1 | 1.2/1 | 1.3/1 | 1.6/1 | 1.2/1 | 1/1 | 1.1/1 | 1.5/1 | 1/1 |

¹ Cellosolve.
² Diethyl ketone.
³ Methyl isobutyl ketone.
⁴ Methyl ethyl ketone.
⁵ Ethyl butyl ketone.
⁶ Diacetone alcohol.

Example 20

Preparation of thermosetting resin powder from amine modified phenolic resin and an aromatic polycarboxylic compound 500 grams of resin from Example A, 418 grams of aromatic polycarboxylic compound from Example Y and 10 grams of calcium stearate are ground together in a laboratory ball mill until essentially all of the material passed U.S. sieve No. 140. The product is a tan colored resin powder. When a small amount (1-2 grams) is placed on a hot plate at about 180° C., this resin melts and then cures to a hard thermoset resin.

Examples 21-25

Following the same general procedure described in Example 20, a series of resin powders are prepared from amine modified phenolic resins and aromatic polycarboxylic compounds. Table IV below describes each resin (including Example 20).

TABLE IV

| | Example Number | | | | | |
|---|---|---|---|---|---|---|
| | 20 | 21 | 22 | 23 | 24 | 25 |
| | Resin Identification | | | | | |
| (Ex. No.) | D | H | I | K | Q | R |
| Part B: | | | | | | |
| Aromatic polycarboxylic compound identification | Y | Y | Y | Y | Y | Y |
| Ratio by wight [of A to B in final product | 1/1 | 0.8/1 | 0.6/1 | 0.5/1 | 0.8/1 | 0.8/1 |

Example 26

Part A.—Sheets of glass cloth (E.C.D.-225-181 finished with gamma-aminopropyltriethoxysilane) are impregnated by dipping the cloth in the resin solution prepared in Example I, and removing the excess resin solution by drawing the cloth over a scraper bar. The impregnated cloth is heated in an oven for about ¼ hour at about 135° C. to remove the solvent from the impregnated cloth and to partially advance the resin. The resulting cloth contains about 40% resin solids and about 6% of volatiles.

Part B.—A series of laminates ⅛" thick are prepared from 12 sheets of resin impregnated cloth prepared as described in Part A. The 12 plies of cloth are laid up with the warp running in the same direction in all plies and the assembly is pressed under a pressure of approximately 300 p.s.i. at a temperature of 350° F. for 90 minutes. After being removed from the mold, the laminate is post-cured by being heated in an air-circulating oven in accordance with the following schedule:

24 hours at 310° F.
24 hours at 350° F.
24 hours at 400° F.
4 hours at 450° F.
48 hours at 500° F.

These laminates have flexural strengths in the range of from about 70,000 to 90,000 p.s.i. at 75° F. The above and all subsequently reported flexural strength values are measured by Federal Specification L-P-406 Test Method No. 1031.

Part C.—The laminates prepared in Part B above are maintained in an air-circulating oven for 100 hours at 600° F. The flexural strengths of the laminates are then determined at 600° F. with values of from about 30,000 to 50,000 p.s.i. being obtained.

What is claimed is:

1. A thermosettable resinous composition comprising in combination:
    (A) an aromatic amine modified novolac resin characterized by having:
        (1) a number average molecular weight of from about 200 to 1000,
        (2) at least two aryl moieties per molecule, the aryl nucleus of each aryl moiety containing from 6 through 10 carbon atoms each,
        (3) at least one divalent bridging moiety of the formula:

wherein $R_1$ and $R_2$ are each individually selected from the group consisting of hydrogen, lower alkyl, lower alkalene, lower haloalkyl aryl of from 6 through 12 carbon atoms, and haloaryl of 6 through 12 carbon atoms, said bridging moiety having the unsatisfied valences of its carbon atom each bonded to a different one of said aryl moieties,
        (4) at least one >NH group per molecule, one bond of which is directly attached to one of said aryl nuclei and the other bond of which is attached to another of said aryl nuclei or to a radical $R_1$ as defined above,
        (5) at least one OH group per molecule each such group being directly attached to a different one of said two aryl nuclei,
        (6) a percent oxygen acetyl of from about 3 to 26, and
        (7) a percent nitrogen acetyl of from about 3 to 26, and
    (B) an aromatic polycarboxylic compound of the formula:

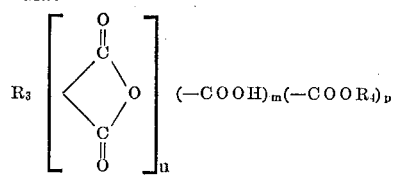

in which $R_3$ is an aromatic radical of three, four, five, or six valences and containing from 6 to 24 carbon atoms, $R_4$ is a monovalent hydrocarbon radical containing less than 19 carbon atoms; $n$ is an integer of from 0 through 3; $m$ is an integer of from 0 through 6; $p$ is an integer of from 0 through 6; when $n$ is 0, the sum of $m+p$ is an integer of from 3 through 6; when $n$ is 1, the sum of $m+p$ is an integer of from 1 through 4; when $n$ is 2, the sum of $m+p$ is an integer of from 0 through 2; and the sum of $n$ and $p$ is always at least 1,
    (C) the relative proportions of said amine modified resin and said aromatic polycarboxylic compound being such that said composition is thermosettable by heat.

2. A thermoset composition of claim 1.

3. A composition of claim 1 wherein said compounds are suspended in an organic solvent medium.

4. A composition of claim 1 wherein said aromatic polycarboxylic compound is an ester of trimellitic anhydride.

5. A composition of claim 1 wherein said aromatic polycarboxylic compound is an ester of benzophenone tetracarboxylic anhydride.

6. A composition of claim 1 wherein said aromatic polycarboxylic compound is an ester of pyromellitic anhydride.

References Cited

UNITED STATES PATENTS

| | | | |
|---|---|---|---|
| 1,047,484 | 12/1912 | Aylsworth | 260—59 |
| 1,217,115 | 2/1917 | Baekeland et al. | 260—51.5X |
| 2,006,345 | 7/1935 | Carswell | 260—31.8 |
| 2,912,406 | 11/1959 | Less et al. | 260—31.8 |
| 2,915,484 | 12/1959 | Kohler et al. | 260—18 |
| 3,373,127 | 3/1968 | Bean et al. | 260—28 |

OTHER REFERENCES

Ellis: Chemistry of Synthetic Resins, 1935, pp. 314–321, 414–415, 424–425 and 430–431.

WILLIAM H. SHORT, Primary Examiner

H. SCHAIN, Assistant Examiner

U.S. Cl. X.R.

117—124, 126, 138.8, 155, 161; 161—198, 205, 264; 162—165; 260—32.6, 32.8, 33.2, 33.4, 33.6, 51.53, 54, 55

PO-1050
(5/69)

UNITED STATES PATENT OFFICE
CERTIFICATE OF CORRECTION

Patent No. 3,558,559          Dated January 26, 1971

Inventor(s) JOHN R. LE BLANC

It is certified that error appears in the above-identified patent and that said Letters Patent are hereby corrected as shown below:

Column 30, lines 65 through 70 should read as follows:

---A mixture of 1005 grams (10.7 moles) of phenol and 995 grams (10.7 moles) of aniline is heated to 70°C. in a 5-liter, 3-neck Pyrex reaction flask that is equipped with stirrer, thermometer, reflux condenser and dropping funnel. At 70°C., 26.6 grams (0.52 moles) of 90% strength formic acid is added and allowed to mix. Next, over about a $2\frac{1}{2}$ hour period, 915 grams (15.25 moles) of 50 weight percent aqueous formaldehyde solution is added to the reaction mixture while stirring vigorously. ---

Signed and sealed this 9th day of May 1972.

(SEAL)
Attest:

EDWARD M. FLETCHER, JR.
Attesting Officer

ROBERT GOTTSCHALK
Commissioner of Patents